United States Patent [19]

Elliott, Jr.

[11] 3,867,308

[45] Feb. 18, 1975

[54] PROCESS FOR PREPARING A PETROLEUM CRACKING CATALYST

[75] Inventor: Curtis Homer Elliott, Jr., Baltimore, Md.

[73] Assignee: W. R. Grace & Co., New York, N.Y.

[22] Filed: Dec. 10, 1973

[21] Appl. No.: 423,637

[52] U.S. Cl. ............................................ 252/455 Z
[51] Int. Cl. ............................................. B01j 11/40
[58] Field of Search ...................... 252/451, 455 Z

[56] References Cited
UNITED STATES PATENTS

| | | | |
|---|---|---|---|
| 2,763,622 | 9/1956 | Plank et al. | 252/451 |
| 3,277,018 | 10/1966 | Plank et al. | 252/451 |
| 3,296,151 | 1/1967 | Heinze et al. | 252/451 X |
| 3,503,873 | 3/1970 | Michalko | 252/451 X |

*Primary Examiner*—C. Dees
*Attorney, Agent, or Firm*—Joseph P. Nigon

[57] ABSTRACT

A process for preparing a hydrocarbon cracking catalyst is disclosed. The process consists of preparing a silica sol by rapid addition of a mineral acid to sodium silicate, adjusting the pH of the sol, adding clay and zeolitic components, spray drying, washing with water, rare earth exchanging if desired, and recovering the product. The catalyst is characterized by excellent attrition resistance and activity.

7 Claims, No Drawings

PROCESS FOR PREPARING A PETROLEUM CRACKING CATALYST

BACKGROUND OF THE INVENTION

Catalytic cracking which came of age as a major refining process in the 1940's was revitalized by the introduction of molecular sieve type catalyst.

It was found that dramatic improvements in cracking activity and selectivity could be obtained by incorporating relatively small amounts of molecular sieve into the catalyst. The sieves were found to have intrinsic activities for cracking far greater than the conventional silicaalumina catalysts.

There are several patents describing processes for preparation of these zeolites. U.S. Pat. No. 3,692,665, for example, covers a method of preparing a faujasite type zeolite that is stabilized by cation and thermal stabilization. The old and more conventional cracking catalysts are described in patents such as U.S. Pat. No. 3,404,097 to Wilson et al. shich describes a silica magnesia fluoride catalyst. U.S. Pat. No. 3,650,988 of Magee et al. covers a process for preparing a hydrocarbon conversion catalyst containing a semi-synthetic portion, i.e., clay and silica-alumina and a zeolitic portion. There are several other patents describing processes for preparing a molecular sieve containing catalyst. The U.S. Pat. No. 3,425,956 of Baker et al. is typical of the large body of art in this area.

BRIEF DESCRIPTION OF THE INVENTION

I have found that a catalyst exhibiting excellent attrition resistance and high reactivity can be prepared by binding clay and faujasite with a silica sol. In my process silica sol is formed by rapidly adjusting the pH of a sodium silicate solution to the pH of about 1.8 to 3.0. This pH range is critical since the deviation from this range results in the preparation of a silica sol of poor quality or in gellation of the sol to silica gel.

The clay constituent is added either to the sodium silicate before the silica sol is formed or to the silica sol. The zeolite, preferably a faujasite in the sodium form, is prepared as a slurry and the pH reduced to about 3 to 4.5. This slurry of zeolitic material is added to the sol clay mixture and spray dried. The spray dried product can be washed with water. This is advantageous over the catalyst systems of prior art which require an ammonium exchange for removal of sodium.

It is advantageous to prepare these faujasitic zeolites in the rare earth form. This conversion is preferably carried out after the spray drying step since conversion at this step eliminates the possibility of loss of the rare earths values during the washing step.

DETAILED DESCRIPTION OF THE INVENTION

The first step of the process is the preparation of the silica sol. This is a critically important step of the process. The silica sol is prepared by addition of a solution of a strong mineral acid, preferably containing about 35 to 80 percent water, to sodium silicate. This addition must be made rapidly to prevent the formation of silica gel or small agglomerates of silica gel in the sol.

The silica content of the sol is limited only by the time before setting which is directly related to the time allowable before the spray drying step.

In a typical preparation the silica sol contains 5 to 15 percent silica. In the next step of the preparation clay is added to the silica sol. The clay is present in amounts of about 10 to 65 percent by weight of the finished catalyst. Naturally occurring clay such as kaolin, halloysite and montmorillonite may be used. Commercially available clay is described as having a particle size range of 60–80 percent less than 2 microns. While raw naturally occurring clays may be used to advantage in the preparation of the catalyst, it is contemplated that heat or chemically modified clays such as metakaolin or acid treated halloysite may be used therein. The clay can be added to the silica sol or it can be added to the silicate prior to sol formation. When the clay is added to the sol it may be added at any pH range from a pH of 0.2 to 3.0. The clay can be added dry or as a slurry and has the effect of raising the sol pH of 0.2 pH units.

The zeolite is added in the next step of the process. The preferred zeolite is the widely available zeolite known as faujasite. The zeolites publicized by the Linde Division of Union Carbide Corporation as Type X and Type Y zeolites have the faujasite structure. These zeolites normally have a silica to alumina ratio of about 2.5 to about 7 with those having a silica to alumina ratio of about 3.5 to 6 being the preferred faujasites. In addition, to the faujasites, the other widely known types of zeolitic materials resistant to acid conditions specific to this process can be used. The zeolite is added in an amount equal to 5 to 60 percent of the final catalyst.

The method of adding the faujasite to the sol is critically important. The silica sol slurry will start to thicken significantly at a pH of about 4 and set solid instantly at a pH of about 5 to 6 depending on the $SiO_2$ concentration and slurry temperature. Thus, if a sodium form faujasite having a pH of 10 to 11 is introduced into the acid silica sol above a pH of 4.5 silica gel will be precipitated at the interface around each of the particles of faujasite. The silica gel in encapsulates the faujasite and prevents uniform dispersion and forms larger lumps due to localized gelling.

To avoid this encapsulation the faujasite is added as an aqueous slurry of the sodium form. The slurry is treated with acid so that that pH is reduced to a pH between 3 and 4.5. At this pH the faujasite can be easily dispersed into the acid silica sol carrier without the particle encapsulation or gel lump formation discussed above.

The next step of the process is the spray drying. It is critically important that the pH of the silica sol-clay-zeolite spray dryer feed slurry be 2.8 to 4.0, since destruction of the zeolite results if the pH is below 2.8, and thickening of the slurry results at a pH of above 4.0. The slurry can be spray dried without difficulty. The spray drier is normally operated at an outlet temperature of about 275° to 500°F. Operating the spray drier at the higher temperature results in a product having an improved attrition resistance.

One of the important advantages of this process is found in the washing step. The spray dried catalyst can be washed with hot water. This is advantageous over the prior art methods of washing that required a wash with ammonium sulfate. In my process the sodium oxide that is not incorporated in the faujasite is in the form of sodium sulfate which is very soluble and is easily removed by a water wash.

The last step of the proces is the removal of a large portion of the exchanged sodium in the faujasite by exchanging with rare earth solution. This is normally accomplished by using a commercially available rare earth chloride solution. This exchange is normally carried out with a solution containing about 3 to 10 percent rare earth ($Re_2O_3$) at a temperature of about 100° to 160°F. The exchange is effected by mixing the washed, spray dried catalyst particles with the rare earth solution for a period of about 0.25 to 1 hours. The solution is separated from the catalyst particles and the particles water washed and dried.

The catalyst is preferably dried at a temperature from about 250° to 450°F to reduce the moisture level to below about 30 percent by weight. The catalyst is then ready for use in a typical fluid cracking operation. It is contemplated that the catalyst may be also prepared in the form of a bead type catalyst which is suitable for use in a moving bed catalytic operation.

The catalyst prepared according to the process of this invention had an alumina content of about 27 to 31 percent, a silica content of about 64 to 70 percent, a rare earth content of about 2.5 to 4 percent. The $Na_2O$ content was less than 1 percent and the sulfate less than 0.5 percent. The product had a water pore volume of about 0.18 to 0.24 and a nitrogen pore volume of about 0.12 to 0.16. The catalysts prepared by my process have an acceptable degree of attrition resistance. Typically, my catalysts, when subjected to a standard Davison Attrition Test, will be found to have attrition indices of 10 to 18. The Davison Attrition Index (DI) as referred to in the following examples is determined as follows: A 7 g sample is screened to remove particles in the 0 to 20 micron size range. The particles above 20 microns are then subjected to a 5 hour test in the standard Roller Particle Size Analyzer using a 0.07 inch jet and 1 inch I.D. U-Tube as supplied by American Instrument Company, Silver Spring, Maryland. An air flow of 9 liters per minute is used. The Davison Index is calculated as follows: Davison Index = 0-20 micron material formed during test/Original 20+micron fraction × 100

My novel catalyst was evaluated by comparing the activity of these catalysts with the activity of a standard catalyst containing calcined rare earth faujasite in the hydrogen form. In this comparison both catalysts are subjected to the standard activity test described by Ciapetta and Henderson in the Oil and Gas Journal of October 16, 1967 at pages 88 to 93. This procedure for comparing the activity of our catalyst with the standard catalyst is used to obtain the data set forth in the following examples.

My invention is illustrated by the following specific but nonlimiting examples.

EXAMPLE 1

A silica sol was prepared by diluting 52 pounds of 16.5 degree Baume' sodium silicate with 12 pounds of water and rapidly adding 4400 ml of a 65 percent sulphuric acid solution. This addition reduced the pH of the sol to 0.6. A total of 48 pounds of the 16.5 Baume' sodium silicate was added slowly to the gel to increase the pH to 1.2. The pH was further increased to 2.9 by slowly adding 51 pounds of 16.5 Baume' sodium silicate. A total of 51 pounds of commercially available kaolin clay sold under the designation KCS clay was added. This addition increased the pH to 3.2.

A total of 14.8 pounds (dry basis) of a commercially available sodium zeolite having a silica to alumina ratio of 4.9 was slurried with 24 pounds of water and the pH adjusted with 380 ml of dilute sulfuric acid. The pH of the sieve slurry at this point was 3.7. This slurry was added to the clay-silica sol mixture and the resulting slurry was spray dried at a inlet temperature of 600°F and an outlet temperature of 350°F.

The product contained the followintg percentages of components on a dry basis: alumina 28.9, rare earth oxide 3.9, silica 62.8, $Na_2O$ 0.68, Sulfate 0.068. The water pore volume was 0.21 and the nitrogen pore volume was 0.15. The product had a bulk density of 0.69 g/cc. and a Davison Attrition Index of 14. The activity of the resulting catalyst was compared to the activity of a standard zeolite containing catalysts in the hydrogen form. In using the micro-activity test discussed previously, the test was carried out at a temperature of 1070°F at 2 and 16 weight hourly space velocity. The results are set out in the table below.

TABLE I

| | Micro-Activity | |
|---|---|---|
| Weight hourly space velocity | 2 | 16 |
| Catalyst of this invention | 91.7 | 72.1 |
| Standard H+ form zeolitic catalyst | 86.1 | 61.9 |

It is obvious from review of these data that the catalyst of my invention is more active than the standard catalyst containing zeolite in hydrogen form.

EXAMPLE II

This example illustrates a modification of the process described in Example I. A silica sol was prepared by rapidly adding a total of 4400 ml of 65 percent solution of sulfuric acid to 50 pounds of 16.5° Baume' sodium silicate diluted with 12 pounds of water. The pH of the sol was 0.6. The pH was adjusted to 1.2 by slowly adding 48 pounds of 16.5° Baume' sodium silicate to adjust the pH to 1.2 and then succesively adding quantities of 16.5 percent Baume' sodium silicate until the pH was adjusted to 2.9.

A total of 37.6 pounds of a commercially available kaolin clay designated KCS clay was added. The pH of the slurry after the clay addition was 3.0. A slurry of sodium zeolite having a silica to alumina ratio of 4.9 was prepared by adding 10.8 pounds (dry basis) of the faujasite to 20 pounds of water. The pH of the slurry was adjusted to 3.9 with 200 ml of dilute sulfuric acid. This slurry was added to the clay-silica sol slurry. The pH was increased to 3.2 by this addition. The resulting slurry was spray dried at an inlet temperature of 600°F and an outlet temperature of 275°F. The dryer feed slurry contained 37 percent solids. The product was split into two lots designated A and B prior to spray drying. Lot A was spray dried at an inlet temperature of 600°F and an outlet temperature of 275°F. Lot B was spray dried at an inlet temperature of 600°F and an outlet temperature of 350°F. The analysis of these two lots is set out in table II below.

TABLE II

|  | Lot A |  | Lot B |  |
|---|---|---|---|---|
| Analysis in percent dry basis |  |  |  |  |
| $Al_2O_3$ | 27.4 |  | 28.1 |  |
| $Re_2O_3$ | 3.7 |  | 3.7 |  |
| $SiO_2$ | 66.7 |  | 66.9 |  |
| $Na_2O$ | 0.61 |  | 0.67 |  |
| Pore Volume |  |  |  |  |
| $H_2O$ | 0.24 |  | 0.20 |  |
| $N_2$ | 0.14 |  | 0.14 |  |
| Bulk Density in g/cc³ | 0.71 |  | 0.72 |  |
| Attrition (Davison Index) | 16 |  | 13 |  |
| Micro-Activity |  |  |  |  |
| Weight hourly space velocity | 2 | 16 | 2 | 16 |
| Catalyst of this example. | 90.3 | 68.1 | 90.0 | 67.4 |
| Standard Catalyst | 86.1 | 61.9 | 86.1 | 61.9 |

It is apparent from these data that the catalysts prepared by this process had higher activity than the standard catalyst prepared to contain hydrogen zeolites. The data would indicate that spray drying at an outlet temperature of 350°F results in a product with a slightly improved attrition index.

EXAMPLE III

In this example the pH of the slurry being spray dried was adjusted to 3.0.

A silica sol was prepared by adding 4400 ml of 65 percent sulfuric acid solution to 52 pounds of 13.6° baume' sodium silicate. The addition was made rapidly. The pH of the sol was 0.1. The pH was adjusted to 0.7 by adding 41 pounds of 13.6° Baume' sodium silicate. A total of 37.6 pounds of kaolin clay was added. This addition increased the pH to 0.8. The pH was then increased to 2.9 by slowly adding sodium silicate in quantities of 56, 15, 5, 5, 4, and 3 pounds, respectively.

A zeolite slurry was prepared by adding 10.8 pounds (dry basis) of a zeolite having a silica to alumina ratio of 4.9 to 20 pounds of water. The pH was adjusted to 3.7 by adding 200 ml of a 65 percent solution of sulfuric acid. The pH at this point was 3.0. This acid adjusted slurry was added to the clay sol mixture.

The product was split into two lots designated lots C and D. Lot C was spray dried at an inlet temperature of 600°F and an outlet temperature of 275°F. Lot D was spray dried in an inlet temperature of 600°F and an outlet temperature of 350°F. The product was washed a total of three times. The first wash was carried out for 20 minutes at a temperature of 140°F with a city water. The slurry pH was 3.6. The second wash was carried out with city water at a temperature of 140°F for a period of about 5 minutes. The slurry pH was about 5. The third wash was carried out with city water for a period of 5 minutes at a temperature of 140°F. The slurry pH was 6.1. Following water wash the catalyst was rare earth exchanged using the technique described previously. The data collected is set out in table III below.

TABLE III

|  | Lot C |  | Lot D |  |
|---|---|---|---|---|
| Analysis in percent dry basis |  |  |  |  |
| $Al_2O_3$ | 28.8 |  | 28.6 |  |
| $Re_2O_3$ | 3.7 |  | 3.4 |  |
| $SiO_2$ | 65.1 |  | 68.0 |  |
| $Na_2O$ | 0.64 |  | 0.66 |  |
| $SO_4$ | 0.045 |  | 0.05 |  |
| Pore Volume |  |  |  |  |
| $H_2O$ | 0.23 |  | 0.23 |  |
| $N_2$ | 0.14 |  | 0.16 |  |
| Bulk density in g/cc³ | 0.71 |  | 0.73 |  |
| Attrition Davison Index | 15 |  | 10 |  |
| Micro-Activity |  |  |  |  |
| Temperature | 1070°F |  | 1070°F |  |
| Weight Hourly Space Velocity | 2 | 16 | 2 | 16 |
| Catalyst of this example. | 89.4 | 67.6 | 89.1 | 68.1 |
| Standard Catalyst | 87.4 | 65.6 | 87.6 | 65.6 |

These data indicate that a satisfactory product is recovered when the clay is added to the silica sol prior to a final adjustment to a ph of about 3.

EXAMPLE IV

In this example the zeolite was added as a partially rare earth exchanged faujasite.

A silica sol was prepared by adding 4400 ml 65°percent sulfuric acid solution to 52 pounds of 13.6° Baume' sodium silicate. The addition was made rapidly. The pH of the sol at this point was 0.6. The pH was adjusted to 1.1 by adding 48 pounds of 16.5° Baume' sodium silicate and was adjusted to a pH of 2.9 by adding an addition 50 pounds of 16.5° Baume' sodium silicate. A total of 37.6 pounds of a commercially available kaolin clay designated KCS clay was added. The pH of the slurry after clay additional is 3.0. A total of 11 pounds (dry basis) sodium zeolite having a silica to alumina ratio of 4.9 that had been previously partially rare earth exchanged to reduce the $Na_2O$ content to 6.29 percent and impart a rare earth content of 11.24 percent to the zeolite was prepared. The pH of the slurry was 6.4. A solution of dilute sulfuric acid was prepared by adding 50 ml of water to 50 ml of sulfuric acid and 73 ml of this dilute acid solution was added to the zeolite. This addition decreased the pH to 3.65. The zeolite slurry was added to the clay-silica sol slurry. The pH was increased to 3.15 by this addition. The spray dryer feed slurry contained 32 percent solids. The product was spray dried at an inlet temperature of 600°F and an outlet temperature of 350°F. The product was washed a total of three times. The first was carried out for a period of 20 minutess at a temperature of 130°F with city water. The second wash was carried out with city water at a temperature of 140°F for 5 minutes. The pH of the slurry was 4.0. The third wash was carried out with city water at a temperature of 140°F for a period of five minutes. The pH of the slurry was 4.7. Following the water wash the catalyst was again rare earth exchanged using the technique described previously. The data collected is set out in the table below.

TABLE VI

| Analysis in percent dry basis | |
|---|---|
| $Al_2O_3$ | 27.0 |
| $Re_2O_3$ | 3.3 |
| $SiO_2$ | 65.97 |
| $Na_2O$ | 0.69 |
| $SO_4$ | 0.12 |

| Pore Volume | |
|---|---|
| $H_2O$ | 0.22 |
| $N_2$ | 0.16 |
| Bulk Density in g/cc | 0.73 |
| Attrition Index Davison | 10 |

| Micro Activity | | |
|---|---|---|
| Weight Hourly Space Velocity | 2 | 16 |
| Catalyst of this invention | 89.6 | 68.5 |
| Standard Catalyst | 84.5 | 60.9 |

These data indicate that a satisfactory product can be prepared when the zeolite is added as a patially rare earth exchanged zeolite.

What is claimed is:

1. A process for preparing a petroleum cracking catalyst having high activity and high density which comprises:
   a. preparing a silica sol by rapidly decreasing the pH of a sodium silicate solution to pH 1.8 to 3.0,
   b. adding clay before, during or after sol formation,
   c. preparing a water slurry of a crystalline zeolitic aluminosilicate and adjusting the pH to about 3 to 4.5,
   d. mixing said slurry with the silica sol-clay slurry prepared in step (b), to prepare a spray drier feed slurry having a pH of 2.8 to 4.0.
   e. spray drying before gellation occurs,
   f. washing with water, drying and recovering the product.

2. The process according to claim 1 wherein the clay is added in an amount equal to about 10–65 percent of the finished catalyst.

3. The process according to claim 1 wherein the zeolitic aluminosilicate is added in an amount equal to about 5–60 percent of final catalyst.

4. The process according to claim 1 wherein the sol is prepared by rapidly adding a strong mineral acid to a sodium silicate solution.

5. The process according to claim 4 wherein the strong mineral acid is sulfuric acid.

6. The process according to claim 1 wherein the zeolitic alumino silicate has a silica to alumina ratio of about 3.5 to 7.

7. A process for preparing a petroleum cracking catalyst which comprises:
   a. preparing a silica sol by rapidly adjusting the pH of a sodium silicate solution to a pH of 2.0 to 3.0 with a 20–65 percent solution of sulfuric acid,
   b. adding a quantity of a kaolin clay in an amount sufficient to provide about 50–65 weight percent of the final catalyst to said silica sol.
   c. preparing an aqueous slurry of a faujasite having a silica to alumina ratio of about 4.5–5.2 and adjusting the pH of said slurry to about 3.0 to 4.5 by adding a mineral acid,
   d. adding said slurry to the silica sol-clay slurry prepared in step (b), in an amount sufficient to provide about 15 to 25 percent of the final catalyst,
   e. spray drying before gellation occurs the resultant slurry and washing with water to decrease the $SO_4$ content to less than 1 percent,
   f. exchanging the dryer product with a rare earth solution to provide a rare earth content of about 2.5 to 5 weight percent in the final product,
   g. washing, drying and recovering the catalyst.

* * * * *